United States Patent [19]

Ando et al.

[11] Patent Number: 5,081,224
[45] Date of Patent: Jan. 14, 1992

[54] PROCESS FOR PRODUCTION OF OLEFIN-TERMINATED POLYESTERS

[75] Inventors: Hiroshi Ando; Kazumasa Hashimoto; Jun Hattori; Kazuya Yonezawa, all of Hyogo, Japan

[73] Assignee: Kanegafuchi Chemical Industry Co., Ltd., Osaka, Japan

[21] Appl. No.: 596,267

[22] Filed: Oct. 12, 1990

[30] Foreign Application Priority Data

Oct. 16, 1989 [JP] Japan .................................. 1-270066
Dec. 14, 1989 [JP] Japan .................................. 1-324933
Dec. 27, 1989 [JP] Japan .................................. 1-344470

[51] Int. Cl.$^5$ .............................................. C08G 63/08
[52] U.S. Cl. ...................................... 528/354; 528/355; 546/318; 546/327; 549/71; 549/484; 549/486; 560/81; 560/103; 560/185
[58] Field of Search ................ 528/355, 354; 546/318, 546/327; 549/71, 484, 486; 560/81, 103, 185

[56] References Cited

U.S. PATENT DOCUMENTS 4,663,429 5/1987 Murai et al. .......................... 528/355
4,835,213 5/1989 Murai et al. .......................... 525/40

Primary Examiner—John Kight, III
Assistant Examiner—Richard L. Jones
Attorney, Agent, or Firm—Jordan and Hamburg

[57] ABSTRACT

This invention relates to processes for producing an olefin-terminated polyester. In one of the processes which comprises reacting an olefin-terminated diester compound with a lactone in the presence of a polymerization catalyst with transesterification ability, the lactone is in a limited amount added to the reaction system. In another process which comprises reacting an olefin-terminated diester compound, a lactone compound, a cyclic acid anhydride and an epoxy compound in the presence of a polymerization catalyst with transesterification ability, the lactone, cyclic acid anhydride and epoxy compound are each in a limited amount added to the reaction system. In accordance with this invention, olefin-terminated polyesters having high terminal modification rates can be synthesized.

9 Claims, 3 Drawing Sheets

PROCESS FOR PRODUCTION OF OLEFIN-TERMINATED POLYESTERS

BACKGROUND OF INVENTION

1. Technical Field

The present invention relates to processes for producing olefin-terminated polyesters. More particularly, the invention relates to a process for producing an olefin-terminated polyester which comprises reacting an olefin-terminated diester compound with a lactone compound and a process for producing an olefin-terminated polyester which comprises copolymerizing an olefin-terminated diester compound, a lactone compound, a cyclic acid anhydride and an epoxy compound.

2. Background Art

Aliphatic polyesters, thanks to their high flexibility and excellent resistance to heat, have heretofore been utilized as components of thermoplastic elastomers, urethane elastomers, adhesive systems, coating compositions, etc. or as plasticizers or modifying agents for a variety of polymers.

The processes known to the art for the production of aliphatic polyesters include the polycondensation reaction of a diol compound with a dibasic acid or a derivative thereof, which yields a hydroxy- or carboxy-terminated polyester, and the polymerization reaction of a lactone compound using a hydroxy-containing initiator compound, for example a glycol, which yields a hydroxy-terminated polyester. However, hydroxy- or carboxy-terminated polyesters are limited in the scope of application and many attempts have heretofore been made to replace these terminal groups with other functional groups. Particularly, olefin-terminated polyesters are of immense use because of their diversity of reactivity.

In one of the hitherto-known production processes for olefin-terminated polyesters, the polycondensation reaction between a diol compound and a dibasic acid or a derivative thereof is conducted in the presence of an olefin-terminated monoalcohol or monocarboxylic acid or a reactive derivative thereof. In an alternative process, a hydroxy- or carboxy-terminated polyester is first produced and, then, the terminal OH or COOH group is modified. However, these processes are disadvantageous in that, inter alia, the reaction conditions must be critically controlled in order that the olefinic group may be introduced into the terminus of the polyester chain in a sufficiently high yield.

Polyesters terminated with a variety of functional groups can be synthesized by reacting ester compounds having the corresponding functional groups with ε-caprolactone as described, inter alia, in Japanese Kokai Patent Publication No. 61-37813 and this method may of course be utilized for the synthesis of olefin-terminated polyesters. However, this process is disadvantageous in that the homopolymerization reaction of ε-caprolactone is given priority to the insertion reaction of the lactone into the ester compound so that the olefinic terminal modification rate cannot be as high as desired. Stated differently, an olefin-terminated polyester containing many ester bonds, that is to say an olefin-terminated polyester containing many lactone chains cannot be obtained.

OBJECT OF INVENTION

The object of the present invention is to solve the above problems and provide a process for producing a polyester having a high olefinic terminal modification rate from an olefin-terminated diester compound and a lactone compound or from an olefin-terminated diester compound, a lactone compound, a cyclic acid anhydride and an epoxy compound.

SUMMARY OF INVENTION

One of the processes for producing an olefin-terminated polyester according to the present invention comprises reacting an olefin-terminated diester compound of the general formula

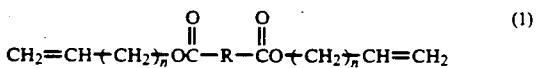

wherein R is a divalent organic group of 1 to 20 carbon atoms; n is a whole number of 0 to 20, with a lactone compound in the presence of a polymerization catalyst with transesterification ability to give an olefin-terminated polyester having a molecular weight within the range of 5,000 to 50,000, characterized in that said lactone compound is added in such a manner that the amount of the unreacted lactone in the reaction system will not exceed 10 mol equivalents relative to the ester bonds other than the ester bond in said unreacted lactone compound which are available in the reaction system.

If the lactone compound is initially present in an excessive amount with respect to the olefin-terminated diester compound, the homopolymerization reaction of the lactone compound is given priority to the transesterification reaction whereby the lactone is inserted into the diester so that the olefinic terminal modification rate is decreased. By arranging, as in the present invention, that the lactone compound is added to the reaction system in such a manner that the amount of the unreacted lactone will not exceed 10 mol equivalents relative to the ester bonds other than the ester bond in the unreacted lactone which are available in the reaction system (i.e. the ester bonds of the diester compound and the ester bonds of the polylactone chain already inserted into the diester compound), the insertion reaction of the lactone into the diester compound competes with the homopolymerization reaction of the lactone compound so that a polyester having a high olefinic terminal modification rate can be obtained. The addition of the lactone compound to the reaction system is conducted preferably in such a manner that said amount will not exceed 5 mol equivalents and, for still better results, 2 mol equivalents.

In another process for producing an olefin-terminated polyester according to the present invention which comprises reacting an olefin-terminated diester compound of general formula (1), a lactone compound, a cyclic acid anhydride and an epoxy compound in the presence of a polymerization catalyst with transesterification ability to give an olefin-terminated polyester with a number average molecular weight of 5,000 to 50,000, the lactone compound, cyclic acid anhydride and epoxy compound are added in such a manner that their respective amounts in the reaction system will not exceed 10 mol equivalents relative to the ester bonds other than the ester bond in the unreacted lactone compound which are available in the reaction system.

Thus, if any of the lactone compound, cyclic acid anhydride and epoxy compound is initially present in an excessive amount relative to the olefin-terminated diester compound, the homopolymerization of the lactone compound and/or the copolymerization of the cyclic acid anhydride and epoxy compound is given priority to the transesterification reaction inserting the lactone, cyclic acid anhydride and epoxy compound into the diester compound, so that the olefinic terminal modification rate is decreased. By insuring, as proposed herein, that the unreacted lactone compound, cyclic acid anhydride and epoxy compound are added to the reaction system in such a manner that the respective amounts of the unreacted lactone, cyclic acid anhydride and epoxy compound in the reaction system will not exceed 10 mol equivalents relative to the ester bonds other than the ester bond in the unreacted lactone which are available in the reaction system (the ester bonds in the diester compounds and the ester bonds formed by the lactone, cyclic acid anhydride and epoxy compound already inserted into the diester compound), the insertion reaction of the lactone, cyclic acid anhydride and epoxy compound into the diester compound competes with the homopolymerization and/or the copolymerization so that a polyester having a high olefinic terminal modification rate can be obtained. The addition of each of said lactone, cyclic acid anhydride and epoxy compound is preferably made so that said respective amounts will not exceed 5 mol equivalents and, for still better results, 2 mol equivalents. These three component substances may be added as previously mixed or independently.

Particularly in the production of a polyester having a number average molecular weight in the range of 5,000 to 50,000, the above-described process yields a polyester having a high olefinic terminal modification rate. When a polyester having a molecular weight less than 5,000, a polyester having a high olefinic terminal modification rate may be produced without resort to this method. On the other hand, if the molecular weight exceeds 50,000, the terminal olefin modification will not be fully effective. Thus, the production process of the present invention is particularly advantageous for the production of a polyester having a molecular weight not exceeding 20,000.

In the above general formula (1) of olefin-terminated diester compound, R means a divalent organic group containing 1 to 20 carbon atoms, preferably 1 to 6 carbon atoms, and preferably is a $C_{1-6}$ divalent hydrocarbon group; and n is a whole number of 0 to 20 and preferably a whole number of 1 to 5. Among specific examples of such diester compound are diallyl phthalate, diallyl isophthalate, diallyl terephthalate, diallyl malonate, diallyl succinate, diallyl glutarate, diallyl adipate, diallyl pimelate, divinyl phthalate, divinyl isophthalate, divinyl terephthalate, divinyl malonate, divinyl succinate, divinyl glutarate, divinyl adipate and divinyl pimelate. From the standpoint of availability and ease of handling, diallyl isophthalate, diallyl adipate and diallyl succinate are preferred.

The lactone compound to be used in the present invention includes, inter alia, β-propiolactone, pivalolactone, α-methyl-β-propiolactone, δ-valerolactone, β-methyl-δ-valerolactone, γ-methyl-δ-valerolactone, dimethyl-δ-valerolactone, ε-caprolactone, δ-methyl-ε-caprolactone and dimethyl-ε-caprolactone. These lactone compounds can be used either alone or in combination. Of the above-mentioned lactone compounds, ε-caprolactone is preferred from the standpoint of reactivity and availability. When two or more lactone compounds are used in combination, one of them is preferably ε-caprolactone. The lactone compounds to be used in combination with ε-caprolactone is preferably β-propiolactone, pivalolactone, α-methyl-β-propiolactone, δ-valerolactone, β-methyl-δ-valerolactone or/and γ-methyl-δ-valerolactone from the standpoint of availability. When reactivity is also taken into consideration, δ-valerolactone, β-methyl-δ-valerolactone and γ-methyl-δ-valerolactone are still more preferred.

As the polymerization catalyst with transesterification ability to be used in the present invention, a broad range of known catalysts can be employed. Particularly preferred are metal alkoxides. Among such metal alkoxides are magnesium ethoxide, aluminum isopropoxide, potassium t-butoxide, zirconium n-propoxide, titanium n-butoxide (n-butyl titanate), titanium isopropoxide (isopropyl titanate), titanium allyloxide (allyl titanate), butyltin trimethoxide, dibutyltin dimethoxide, tributyltin methoxide, zinc di-n-butoxide and so on. From the standpoint of availability and ease of handling, titanium n-butoxide and titanium isopropoxide are preferred.

The amount of the catalyst, based on the olefin-terminated diester compound, is preferably in the range of 0.0001 to 1.0 mol equivalent. From the standpoint of terminal modification rate, the amount of the catalyst is preferably not more than 0.1 mol equivalent. From the standpoint of reaction rate, it is preferably not less than 0.001 mol equivalent.

The reaction temperature is preferably 80° to 230° C. and, for still better results, 100° to 200° C. from the standpoint of catalyst activity.

The cyclic acid anhydride to be used in the present invention is virtually optional in kind but from the standpoint of availability and ease of handling, phthalic anhydride, succinic anhydride, maleic anhydride and glutaric anhydride, as well as acid anhydrides derived therefrom (such as methylendomethylenetetrahydrophthalic anhydride, endomethylenetetrahydrophthalic anhydride, chlorendic anhydride, methyltetrahydrophthalic anhydride, hexahydrophthalic anhydride, etc.) can be advantageously used either alone or in combination.

From the standpoint of reactivity, the epoxy compound to be used in the present invention is preferably an epoxy compound of the general formula

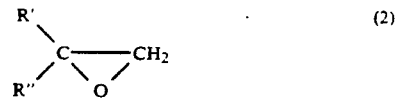

(2)

wherein R' and R" each means a hydrogen atom or a monovalent organic group containing 1 to 20 carbon atoms. Moreover, from the standpoint of availability and ease of handling, phenyl glycidyl ether, n-butyl glycidyl ether, t-butyl glycidyl ether, 2-ethylhexyl glycidyl ether, dibromocresyl glycidyl ether, styrene oxide, propylene oxide, butylene oxide and epoxy compounds derived therefrom are preferred. These epoxy compounds can be used either alone or in combination.

In this process of the present invention, the epoxy compound is an essential reactant for the polymerization of the cyclic acid anhydride and the cyclic acid anhydride is essential to polymerization of the epoxy compound. Therefore, in order to enhance the reaction rate, it is preferable to insure that the total molar ratio of the cyclic acid anhydride to the epoxy compound lie somewhere between 0.8 and 1.2.

The olefin-terminated polyester obtainable by the present invention can be directly used as a component of copolymerization systems or used as a plasticizer or a modifying agent. Moreover, the terminal olefin group may be replaced with a different functional group. For example, a room temperature curable resin can be obtained by adding a hydrosilane having a hydrolyzable group to the polyester by hydrosilylation reaction.

Thus, in accordance with the present invention, olefin-terminated polyesters having high functional modification rates can be produced from an olefin-terminated diester compound and a lactone compound or from an olefin-terminated diester compound, a lactone compound, a cyclic acid anhydride and an epoxy compound.

DETAILED DESCRIPTION OF PREFERRED EMBODIMENTS

The following examples are intended to illustrate the invention in further detail.

EXAMPLE 1

Figure 1:
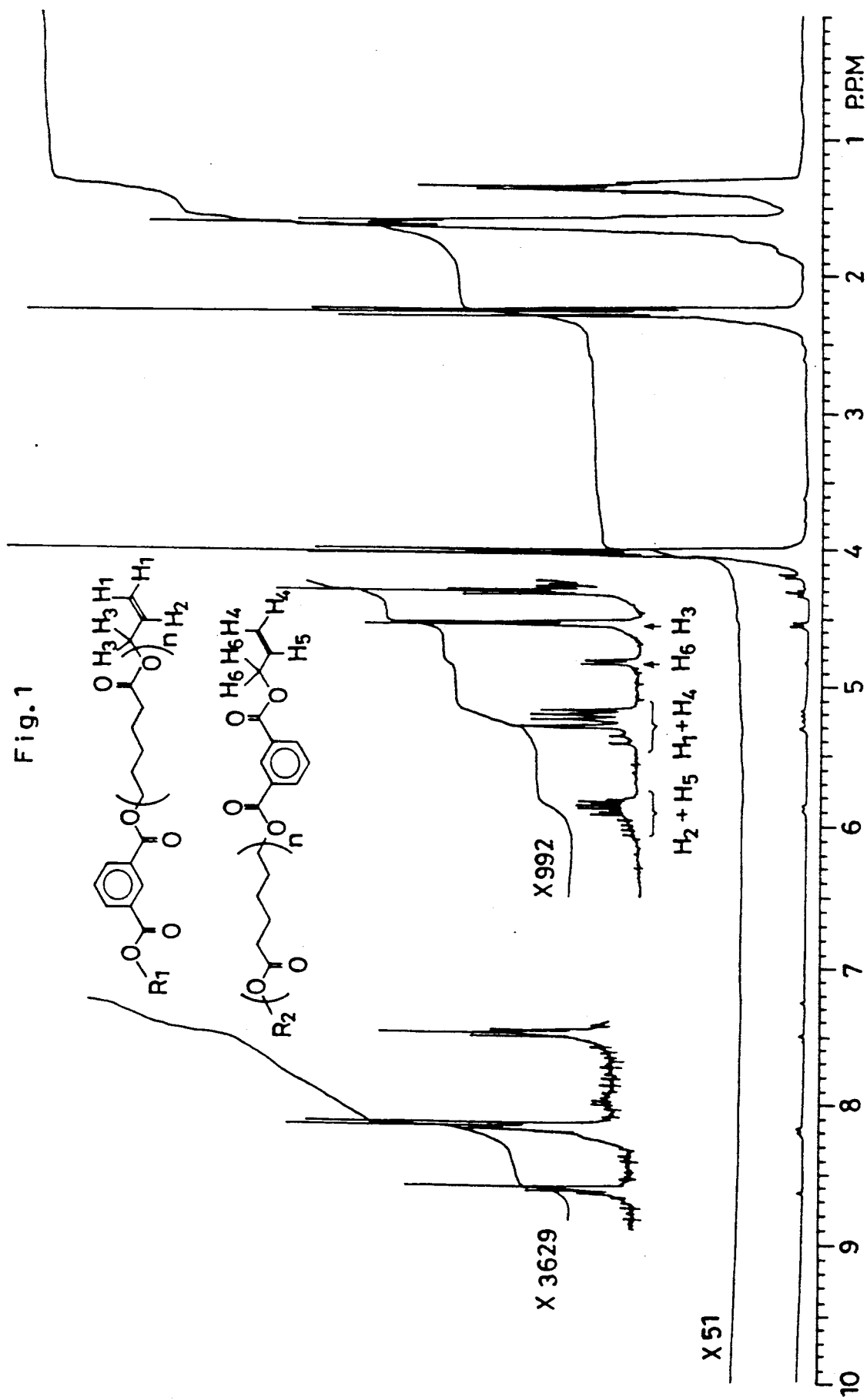
FIG. 1 is a proton NMR spectrum of the compound synthesized in one example of the invention.

A 1-liter glass four-necked flask fitted with a stirring rod, thermometer, dropping funnel, nitrogen gas inlet tube and condenser, after purging with nitrogen gas, was charged with 4.4 ml (20 mmol) of diallyl isophthalate which had been dried over molecular sieves 4A1/16 and 0.20 ml (0.60 mmol) of tetrabutyl titanate. The mixture was stirred at 170° C. for 30 minutes, at the end of which time 150 ml (1.35 mol) of ε-caprolactone previously dried over molecular sieves 4A1/16 was added dropwise with stirring at 170° C. in 6 installments, viz. 4.4 ml (40 mmol), 4.4 ml (40 mmol), 9.0 ml (81 mmol), 18.0 ml (0.16 mol), 36.0 ml (0.32 mol) and 78.0 ml (0.70 mol) through the dropping funnel. After completion of each addition, the reaction mixture was analyzed by proton NMR spectrometry at a predetermined time after addition and the next addition was made only after confirming that the added ε-caprolactone had been almost completely consumed. All the additions were completed in about 3 hours, at the end of which time the mixture was further stirred at 170° C. for 3 hours. The proton NMR spectrum of the resulting compound is shown in FIG. 1, which indicates that this is a polyester containing an average of 1.85 allyl ester terminal groups per molecule. The proton NMR spectra were registered in CDCl$_3$ on a 300-MHz Varian XL-300 spectrometer. As determined by vapor pressure osmosis (VPO) analysis, the number average molecular weight of the compound was 8,000.

EXAMPLE 2

A 1-liter glass four-necked flask fitted with a stirring rod, thermometer, dropping funnel, nitrogen gas inlet tube and condenser, after purging with nitrogen gas, was charged with 4.4 ml (20 mmol) of diallyl isophthalate which had been dried over molecular sieves 4A1/16 and 0.20 ml (0.60 mmol) of tetrabutyl titanate. The mixture was stirred at 170° C. for 30 minutes, after which it was cooled to 100° C. Then, at this temperature, 100 ml (0.90 mol) of ε-caprolactone previously dried over molecular sieves 4A1/16 was added dropwise through the dropping funnel in 6 installments, viz. 4.4 ml (40 mmol), 4.6 ml (41 mmol), 9.0 ml (81 mmol), 18.0 ml (0.16 mol), 36.0 ml (0.32 mol) and 28.0 ml (0.25 mol). The reaction mixture was analyzed by gel permeation chromatography (GPC) at a predetermined time after each addition and the next addition was made only after confirming that the added ε-caprolactone had been almost completely consumed. All the additions were completed in about 5 hours, after which the reaction mixture was stirred at 100° C. for 5 hours.

Proton NMR spectrometry of the resulting compound gave an NMR spectrum similar to that shown in FIG. 1, which indicates that this is a polyester containing an average of 1.83 allyl ester terminal groups per molecule. VPO analysis revealed that the number average molecular weight of the compound is 5,500.

EXAMPLE 3

A 3-liter stainless steel reactor fitted with a stirring rod, thermometer, dropping funnel, nitrogen gas inlet tube and condenser, after purging with nitrogen gas, was charged with 27.5 ml (125 mmol) of diallyl isophthalate which had been dried over molecular sieves 4A1/16 and 1.28 ml (3.75 mmol) of tetrabutyl titanate. The mixture was stirred at 170° C. for 5 minutes, after which 943 ml (8.5 mol) of ε-caprolactone previously dried over molecular sieves 4A1/16 was added dropwise with stirring at 170° C. in 9 installments of 11.0 ml (99 mmol), 19.0 ml (171 mmol), 29.0 ml (262 mmol), 42.0 ml (379 mmol), 64.0 ml (578 mmol), 95.0 ml (857 mmol), 144.0 ml (1.30 mol), 217.0 ml (1.96 mol) and 322.0 ml (2.91 mol) through the dropping funnel. After completion of each addition, the reaction mixture was analyzed by proton NMR spectrometry at a predetermined time after addition and the next addition was made only after confirming that the added ε-caprolactone had been almost completely consumed. All the additions were completed in about 5 hours, at the end of which time the mixture was stirred at 170° C. for 1 hour.

The proton NMR spectrum of the resulting polyester was similar to the spectrum shown in FIG. 1, indicating that this polyester contains an average of 1.86 allyl ester terminal groups per molecule. As determined by VPO analysis, the number average molecular weight of this polyester was 8,800.

EXAMPLE 4

A 1-liter glass four-necked flask fitted with a stirring rod, thermometer, dropping funnel, nitrogen gas inlet tube and condenser, after purging with nitrogen gas, was charged with 3.7 ml (20 mmol) of diallyl succinate which had been dried over molecular sieves 4A1/16 and 0.20 ml (0.60 mmol) of tetrabutyl titanate. The mixture was stirred at 170° C. for 30 minutes, at the end of which time 150 ml (1.35 mol) of ε-caprolactone previously dried over molecular sieves 4A1/16 was added dropwise with stirring at 170° C. in 6 installments, viz. 4.4 ml (40 mmol), 4.4 ml (40 mmol), 9.0 ml (81 mmol), 18.0 ml (0.16 mol), 36.0 ml (0.32 mol) and 78.0 ml (0.70 mol) through the dropping funnel. After completion of each addition, the reaction mixture was analyzed by proton NMR spectrometry at a predetermined time after addition and the next addition was made only after confirming that the added ε-caprolactone had been almost completely consumed. All the additions were completed in about 3 hours, at the end of which time the mixture was further stirred at 170° C. for 3 hours.

The proton NMR spectrum of the resulting compound indicates that this is a polyester containing an average of 1.80 allyl ester terminal groups per molecule. As determined by VPO analysis, the number average molecular weight of the compound was 8,000.

EXAMPLE 5

A 1-liter glass four-necked flask fitted with a stirring rod, thermometer, dropping funnel, nitrogen gas inlet tube and condenser, after purging with nitrogen gas, was charged with 4.4 ml (20 mmol) of diallyl isophtalate and 0.20 ml (0.60 mmol) of tetrabuthyl titanate. The mixture was stirred at 170° C. for 30 minutes, at the end of which time 222 ml (2.0 mol) of $\epsilon$-caprolactone was serially added with stirring at 170° C. through the dropping funnel at the speed of 37 ml/hr. All of the proton NMR spectra which were analyzed the reaction mixtures every 30 minutes indicated that the amounts of the unreacted $\epsilon$-caprolactone which were available in the reaction system were less than 1 mol equivalent relative to the ester bonds other than the ester bond in the unreacted $\epsilon$-caprolactone respectively. All the additions were completed in about 6 hours, at the end of which time the mixture was further stirred at 170° C. for 3 hours.

The proton NMR spectrum of the resulting compound indicates that this is a polyester containing an average of 1.80 allyl ester terminal groups per molecule. As determined by VPO analysis, the number average molecular weight of the compound was 12,000.

COMPARATIVE EXAMPLE 1

A 1-liter glass four-necked flask fitted with a stirring rod, thermometer, dropping funnel, nitrogen gas inlet tube and condenser, after purging with nitrogen gas, was charged with 4.4 ml (20 mmol) of diallyl isophthalate which had been dried over molecular sieves 4A1/16 and 0.20 ml (0.60 mmol) of tetrabutyl titanate. The mixture was stirred at 170° C. for 30 minutes and, then, cooled to 100° C. Then, 100 ml (0.90 mol) of $\epsilon$-caprolactone previously dried over molecular sieves 4A1/16 was added en bloc. The mixture was then stirred at 170° C. for 2 hours.

Figure 2:
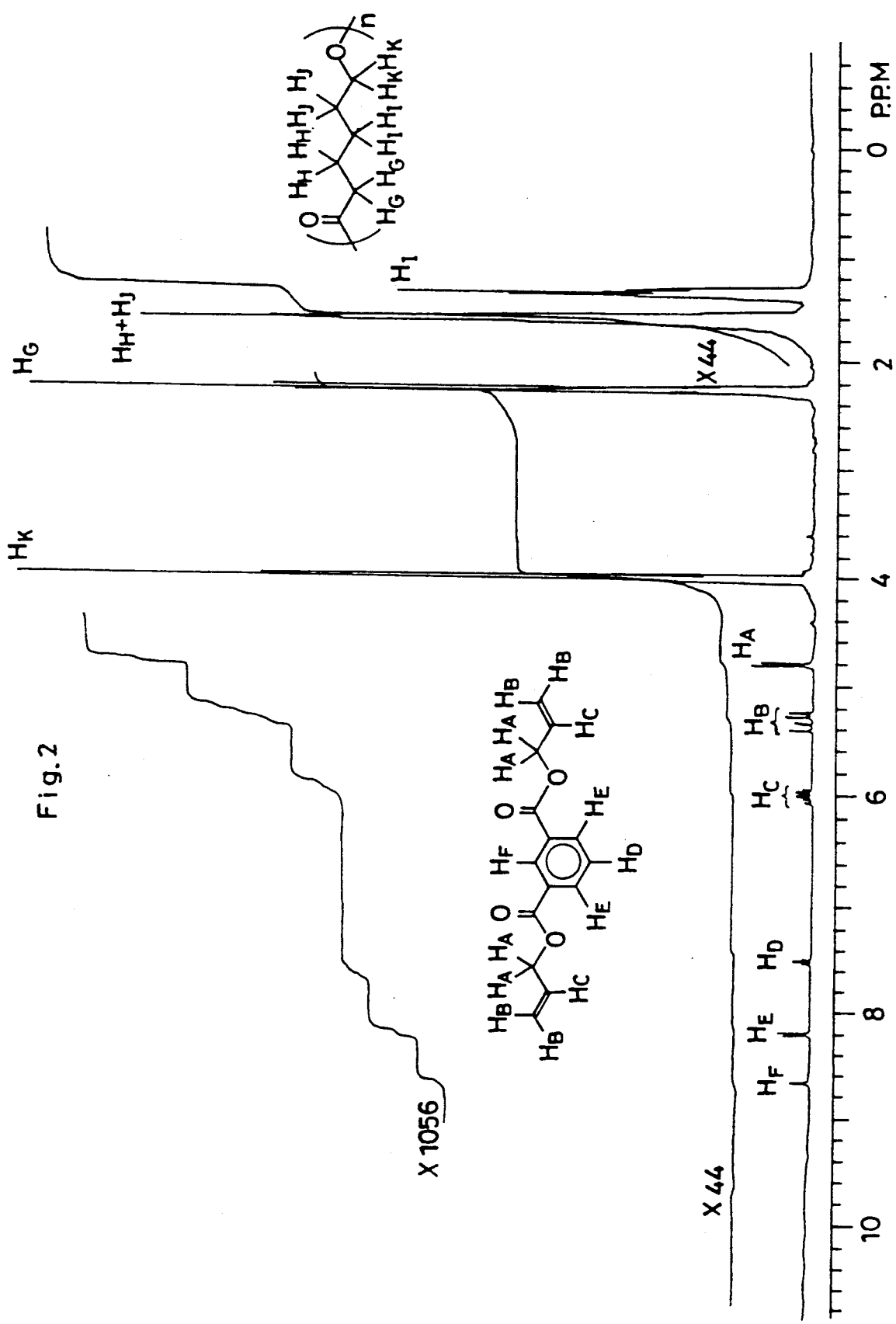
FIG. 2 is a proton NMR spectrum of the compound synthesized in a comparative example.

The $^H$NMR spectrum of this product is shown in FIG. 2. This spectrum scarcely shows a peak at 4.5 ppm corresponding to $H_3$ in FIG. 1, indicating that substantially no allyl group had been attached to the terminus of the polylactone chain. Furthermore, the integration ratio of the peak at 4.8 ppm which is assignable to the methylene protons of the allyl group of diallyl isophthalate to the peak at 7.4–8.7 ppm which is assignable to the aromatic ring protons indicates that the ester bond of the diallyl isophthalate scarcely underwent an ester exchange reaction with the ester bond of polycaprolactone (the polycaprolactone inserting reaction) and that the product was a mixture of polycaprolactone and diallyl isophthalate.

EXAMPLE 6

A 100-ml glass four-necked flask fitted with a stirring rod, thermometer, dropping funnel, nitrogen gas inlet tube and condenser was purged with nitrogen gas, followed by addition of 2.2 ml (10 mmol) of diallyl isophthalate which had been dried over molecular sieves 4A1/16 and 0.10 ml (0.30 mmol) of tetrabutyl titanate. The mixture was stirred at 170° C. for 30 minutes, after which 4.0 ml (36 mmol) of $\epsilon$-caprolactone previously dried over molecular sieves 4A1/16 was added dropwise with stirring at 170° C. After 30 minutes, the reaction mixture was analyzed by proton NMR spectrometry to confirm that the added $\epsilon$-caprolactone had been almost completely consumed. Then, 0.7 g (7.0 mmol) of succinic anhydride and 0.95 ml (7.0 mmol) of phenyl glycidyl ether were simultaneously added. After 30 minutes, the reaction mixture was analyzed by proton NMR spectrometry to confirm that the added succinic anhydride and phenyl glycidyl ether had been almost completely consumed. Thereafter, the dropwise addition of $\epsilon$-caprolactone and the addition of succinic anhydride and phenyl glycidyl ether were repeated in the same manner as above for a total of 10 times. Thus, ultimately, 40 ml (360 mmol) of $\epsilon$-caprolactone, 7.0 g (70 mmol) of succinic anhydride and 9.5 ml (70 mmol) of phenyl glycidyl ether were added over a period of about 10 hours. The reaction mixture was then stirred at 170° C. for 5 hours.

Figure 3:
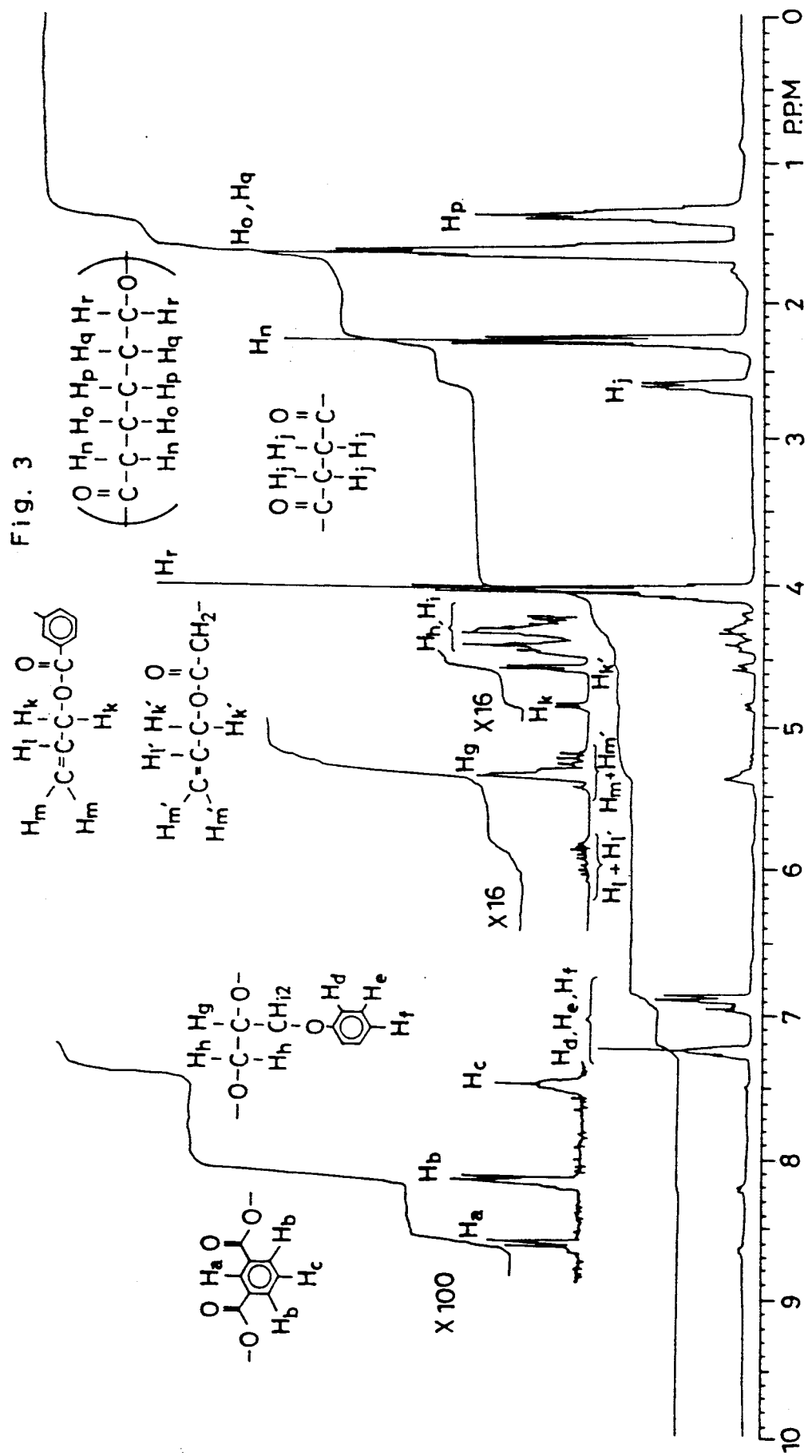
FIG. 3 is a proton NMR spectrum of the compound synthesized in another example of the invention.

The proton NMR spectrum of the resulting polyester is shown in FIG. 3. It was confirmed that this polyester is a poly(caprolactone-succinic anhydride-phenyl glycidyl ether) terpolymer containing an average of 1.75 allyl ester terminal groups per molecule. As determined by VPO analysis, the number average molecular weight of this polyester was 6,300.

EXAMPLE 7

A 1-liter glass four-necked flask fitted with a stirring rod, thermometer, dropping funnel, nitrogen gas inlet tube and condenser was purged with nitrogen gas, followed by addition of 6.6 ml (30 mmol) of diallyl isophthalate which had been dried over molecular sieves 4A1/16 and 0.30 ml (0.90 mmol) of tetrabutyl titanate. The mixture was stirred at 170° C. for 30 minutes, after which 10.0 ml (90 mmol) of $\epsilon$-caprolactone previously dried over molecular sieves 4A1/16 was added dropwise with stirring at 170° C. After 30 minutes, the reaction mixture was analyzed by GPC to confirm that the added $\epsilon$-caprolactone had been almost completely consumed. Then, 4.5 g (45 mmol) of succinic anhydride and 6.1 ml (45 mmol) of phenyl glycidyl ether were added in sequence. After 30 minutes, the reaction mixture was analyzed by GPC to confirm that the added succinic anhydride and phenyl glycidyl ether had been substantially consumed. Thereafter, the dropwise addition of $\epsilon$-caprolactone and the addition of succinic anhydride and phenyl glycidyl ether were repeated in the same manner as above for a total of 8 times. Thus, ultimately, 80 ml (720 mmol) of $\epsilon$-caprolactone, 36.0 g (360 mmol) of succinic anhydride and 48.8 ml (360 mmol) of phenyl glycidyl ether were added over a period of about 8 hours. The reaction system was further stirred at 170° C. for 5 hours.

The proton NMR spectrum of the resulting polyester was similar to the spectrum shown in FIG. 3, indicating that this polyester was a poly(caprolactone-succinic anhydride-phenyl glycidyl ether) terpolymer containing an average of 1.81 allyl ester terminal groups per molecule. As determined by VPO analysis, the number average molecular weight of this polyester was 6,600.

EXAMPLE 8

A 3-liter stainless steel reactor fitted with a stirring rod, thermometer, dropping funnel, nitrogen gas inlet tube and condenser was purged with nitrogen gas, followed by addition of 60.0 ml (0.27 mol) of diallyl isophthalate which had been dried over molecular sieves 4A1/16 and 2.7 ml (8.1 mmol) of tetrabutyl titanate. The mixture was stirred at 170° C. for 30 minutes, after which 133 ml (1.20 mol) of ε-caprolactone previously dried over molecular sieves 4A1/16 was added dropwise with stirring at 170° C. After 30 minutes, the reaction mixture was analyzed by GPC to confirm that the added ε-caprolactone had been almost completely consumed. Then, a mixture of 60 g (0.60 mol) of succinic anhydride and 86 ml (0.60 mol) of n-butyl glycidyl ether was added. After 30 minutes, the reaction mixture was analyzed by GPC to confirm that the added succinic anhydride and n-butyl glycidyl ether had been substantially consumed. Thereafter, the dropwise addition of ε-caprolactone and the addition of succinic anhydride-n-butyl glycidyl ether mixture were repeated in the same manner as above for a total of 8 times. Thus, ultimately 1,064 ml (9.60 mol) of ε-caprolactone, 480 g (4.80 mol) of succinic anhydride and 688 ml (4.80 mol) of n-butyl glycidyl ether were added over a period of about 8 hours. Then, the reaction system was further stirred at 170° C. for 5 hours.

Proton NMR spectrometry revealed that the product was a poly(caprolactone-succinic anhydride-n-butyl glycidyl ether) terpolymer containing an average of 1.85 allyl ester terminal groups per molecule. As determined by VPO analysis, the number average molecular weight of this compound was 8,400.

EXAMPLE 9

A 100-ml glass four-necked flask fitted with a stirring rod, thermometer, dropping funnel, nitrogen gas inlet tube and condenser was purged with nitrogen gas, followed by addition of 2.2 ml (10 mmol) of diallyl isophthalate which had been dried over molecular sieves 4A1/16 and 0.10 ml (0.30 mmol) of tetrabutyl titanate. The mixture was stirred at 170° C. for 30 minutes, after which 4.0 ml (36 mmol) of ε-caprolactone previously dried over molecular sieves 4A1/16 was added dropwise with stirring at 170° C. After 30 minutes, the reaction mixture was analyzed by proton NMR spectrometry to confirm that the added ε-caprolactone had been almost completely consumed. Then, 1.0 g (7.0 mmol) of phthalic anhydride and 0.95 ml (7.0 mmol) of phenyl glycidyl ether were added in sequence. After 30 minutes, the reaction mixture was analyzed by proton NMR spectrometry to confirm that the added phthalic anhydride and phenyl glycidyl ether had been substantially consumed. Thereafter, the dropwise addition of ε-caprolactone and the addition of phthalic anhydride and phenyl glycidyl ether were repeated in the same manner as above for a total of 10 times. Thus, ultimately, 40 ml (360 mmol) of ε-caprolactone, 10.0 g (70 mmol) of phthalic anhydride and 9.5 ml (70 mmol) of phenyl glycidyl ether were added over a period of about 10 hours. The reaction mixture was further stirred at 170° C. for 5 hours.

The proton NMR spectrum of the resulting product showed that this polyester is a poly(carprolactone-phthalic anhydride-phenyl glycidyl ether) terpolymer containing an average of 1.75 allyl ester terminal groups per molecule. As determined by VPO analysis, the number average molecular weight of this polyester was 6,300.

EXAMPLE 10

A 1-liter glass four-necked flask fitted with a stirring rod, thermometer, dropping funnel, nitrogen gas inlet tube and condenser, after purging with nitrogen gas, was charged with 5.5 ml (25 mmol) of diallyl adipate which had been dried over molecular sieves 4A1/16 and 0.26 ml (0.75 mmol) of tetrabutyl titanate. The mixture was stirred at 170° C. for 30 minutes, at the end of which time 22.0 ml (0.2 mol) of ε-caprolactone previously dried over molecular sieves 4A1/16 was added dropwise with stirring at 170° C. in 2 installments, viz. 11.0 ml (100 mmol), 11.0 ml (100 mmol) through the dropping funnel. A further mixture of 157 g (1.375 mol) of ε-caprolactone, 71 g (0.55 mol) of n-butyl glycidyl ether which had been dried over molecular sieves 4A1/16 and 50 g (0.5 mol) of succinic anhydride was kept at 60° C. and added dropwise into the above said first mixture in 4 installments, viz. 23.4 g, 46.8 g, 93.6 g, 114.2 g. The first mixture was stirred at 170° C. while the further mixture was added. After completion of each installment, the reaction mixture was analyzed by proton NMR spectrometry at a predetermined time after addition and the next addition was made only after confirming that the added ε-caprolactone, n-butyl glycidyl ether and succinic anhydride had been almost completely consumed. All the additions were completed in about 6 hours, at the end of which time the mixture was further stirred at 170° C. for 4 hours.

The proton NMR spectrum of the resulting compound indicates that this is a poly(caprolactone-succinic anhydride-n-butyl glycidyl ether)terpolymer containing an average of 1.81 allyl ester groups per molecule. As determined by VPO analysis, the number average molecular weight of the compound was 11,600.

COMPARATIVE EXAMPLE 2

A 1-liter glass four-necked flask fitted with a stirring rod, thermometer, dropping funnel, nitrogen gas inlet tube and condenser was purged with nitrogen gas, followed by addition of 2.2 ml (10 mmol) of diallyl isophthalate which had been dried over molecular sieves 4A1/16 and 0.10 ml (0.30 mmol) of tetrabutyl titanate. The mixture was stirred at 170° C. for 30 minutes, after which 40 ml (360 mmol) of ε-caprolactone which had been previously dried over molecular sieves 4A1/16, 7.0 g (70 mmol) of succinic anhydride and 9.5 ml (70 mmol) of phenyl glycidyl ether were added all at once. Thereafter, the reaction system was further stirred at 170° C. for 10 hours.

The $^H$NMR spectrum of this product scarcely shows a peak at 4.5 ppm corresponding to $H_k$, in FIG. 3, indicating that substantially no allyl group had been attached to the termini of the polyester. Furthermore, the integration ratio of the peak at 4.8 ppm which is assignable to the methylene protons of the allyl group of diallyl isophthalate to the peak at 7.4–8.7 ppm which is assignable to the aromatic ring protons indicates that the ester bonds of the diallyl isophthalate scarcely underwent an ester exchange reaction (the reaction for insertion of ε-caprolactone, succinic anhydride and phenyl glycidyl ether) and that the product is a mixture of a poly(caprolactone-succinic anhydride-phenyl glycidyl ether) terpolymer and diallyl isophthalate.

What is claimed is:

1. A process for producing an olefin-terminated polyester having a number average molecular weight of 5,000 to 50,000 from an olefin-terminated diester compound of the general formula

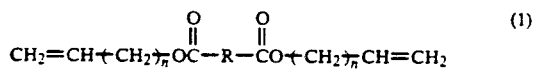

wherein R means a divalent organic group of 1 to 20 carbon atoms and n is a whole number of 0 to 20 and a lactone compound in the presence of a polymerization catalyst with transesterification ability, which comprises adding said lactone compound to a reaction system in such a manner that the amount of the unreacted lactone in the reaction system will not exceed 10 mol equivalents relative to the ester bonds other than the ester bond in the unreacted lactone which are available in the reaction system.

2. A process for producing an olefin-terminated polyester having a number average molecular weight of 5,000 to 50,000 from an olefin-terminated diester compound of the general formula

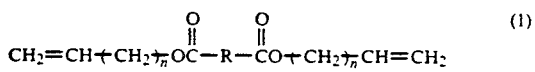

wherein R means a divalent organic group of 1 to 20 carbon atoms and n is a whole number of 0 to 20, a lactone compound, a cyclic acid anhydride and an epoxy compound in the presence of a polymerization catalyst with transesterification ability, which comprises adding said lactone compound, cyclic acid anhydride and epoxy compound to a reaction system in such a manner that the respective amounts of the unreacted lactone, cyclic acid anhydride and epoxy compound in the reaction system will not exceed 10 mol equivalents relative to the ester bonds other than the ester bond in the unreacted lactone which are available in the reaction system.

3. The process of claim 1 or 2 wherein said olefin-terminated diester compound is at least one member of the class consisting of diallyl isophthalate, diallyl adipate and diallyl succinate.

4. The process of claim 1 or 2 wherein said lactone compound is ε-caprolactone.

5. The process of claim 1 or 2 wherein said polymerization catalyst with transesterification ability is tetrabutyl titanate and/or tetraisopropyl titanate.

6. The process of claim 2 wherein said cyclic acid anhydride is at least one member of the class consisting of phthalic anhydride, succinic anhydride and maleic anhydride, inclusive of acid anhydrides derived therefrom.

7. The process of claim 2 wherein said epoxy compound is an epoxy compound of the general formula

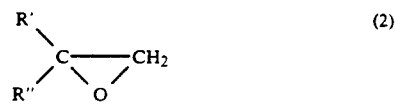

wherein R' and R" each means a hydrogen atom or a monovalent organic group containing 1 to 20 carbon atoms.

8. The process of claim 2 wherein said epoxy compound is at least one member of the class consisting of phenyl glycidyl ether, n-butyl glycidyl ether and t-butyl glycidyl ether, inclusive of epoxy compounds derived therefrom.

9. The process of claim 2 wherein the molar ratio of said cyclic acid anhydride and said epoxy compound based on total amounts added is between 0.8 and 1.2.

* * * * *